Figure 2:
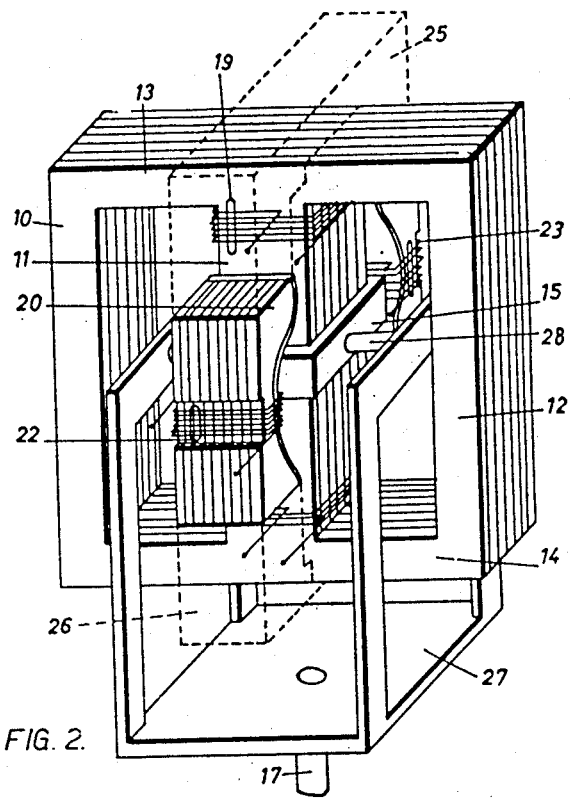

Dec. 15, 1964     E. R. LAITHWAITE     3,161,793
ELECTRICAL MACHINES INVOLVING THE RECIPROCATION OF MOVING PARTS
Filed Sept. 5, 1961     4 Sheets-Sheet 1
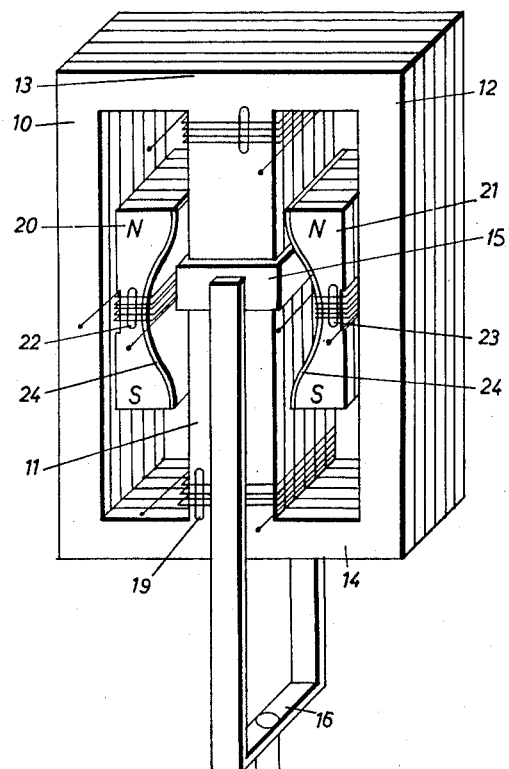
FIG. 1.
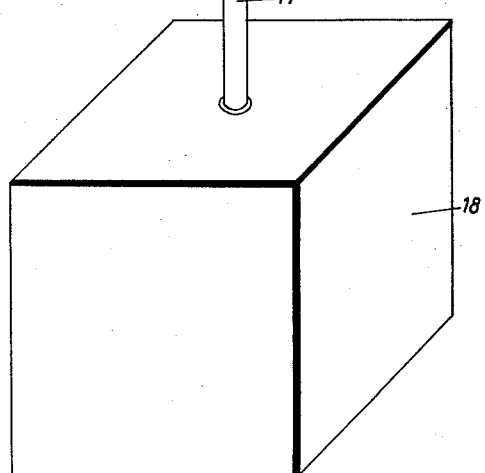
INVENTOR:
ERIC ROBERTS LAITHWAITE
BY
Stevens, Davis, Miller & Mosher
Attorneys Dec. 15, 1964 E. R. LAITHWAITE 3,161,793
ELECTRICAL MACHINES INVOLVING THE RECIPROCATION OF MOVING PARTS
Filed Sept. 5, 1961 4 Sheets-Sheet 2

INVENTOR:
ERIC ROBERTS LAITHWAITE
BY
Stevens, Davis, Miller & Mosher
Attorney

Dec. 15, 1964  E. R. LAITHWAITE  3,161,793
ELECTRICAL MACHINES INVOLVING THE RECIPROCATION OF MOVING PARTS
Filed Sept. 5, 1961  4 Sheets-Sheet 3

INVENTOR:
ERIC ROBERTS LAITHWAITE
BY
Stevens, Davis, Miller & Mosher
Attorneys

INVENTOR:
ERIC ROBERTS LAITHWAITE

United States Patent Office 3,161,793
Patented Dec. 15, 1964

3,161,793
ELECTRICAL MACHINES INVOLVING THE
RECIPROCATION OF MOVING PARTS
Eric Roberts Laithwaite, Cheadle, England, assignor to
National Research Development Corporation, London,
England, a British corporation
Filed Sept. 5, 1961, Ser. No. 135,993
Claims priority, application Great Britain Sept. 13, 1960
9 Claims. (Cl. 310—27)

The present invention relates to electrical machines and is more particularly concerned with machines which involve the reciprocation of the moving parts.

One of the objects of the invention is to provide a multi-polar machine of this type.

Another object of the invention is to provide a machine which when used as a generator gives an alternating current having a frequency which is a multiple of the frequency of oscillation of the moving parts.

A further object of the invention is to provide a machine which may be coupled directly to the moving part of a prime mover, if the machine is to be used as a generator, or to the moving part of a load, if the machine is to be used as a motor.

According to the invention, an electrical machine comprises a magnetic structure having a centre limb and two outer limbs all of which are joined at both ends, two fixed coils mounted on said centre limb and carrying alternating current, a third coil mounted on said centre limb intermediate said two fixed coils and capable of reciprocatory movement therebetween and multi-polar field structures located adjacent opposite faces of said centre limb and energised from a direct current source to generate a steady magnetic field traversed by said third coil during its reciprocatory movement.

According to a feature of the invention, an electrical machine comprises a magnetic structure having a centre limb and two outer limbs all of which are joined at both ends, two fixed coils mounted on said centre limb and connected to the output of the generator, a third coil mounted on said centre limb intermediate said two fixed coils, means for imparting reciprocatory movement to said third coil and multi-polar field structures located adjacent opposite faces of said centre limb and energised from a direct current source to generate a steady magnetic field traversed by said third coil during its reciprocatory movement, whereby there is generated in said fixed coils an alternating current whose frequency is a multiple of the frequency of the reciprocatory movement of said third coil.

According to another feature of the invention, an electrical machine comprises a magnetic structure having a centre limb and two outer limbs all of which are joined at both ends, two fixed coils mounted on said centre limb and connected to an alternating current source, a third coil mounted for reciprocation on said centre limb intermediate said two fixed coils and multi-polar field structures located adjacent opposite faces of said centre limb and energised from a direct current source to generate a steady magnetic field whereby interaction between the steady magnetic field and the field generated by current flow in said fixed coils causes reciprocatory movement of said third coil on said centre limb, the frequency of said reciprocatory movement being a sub-multiple of the frequency of the alternating current source.

Figure 3:
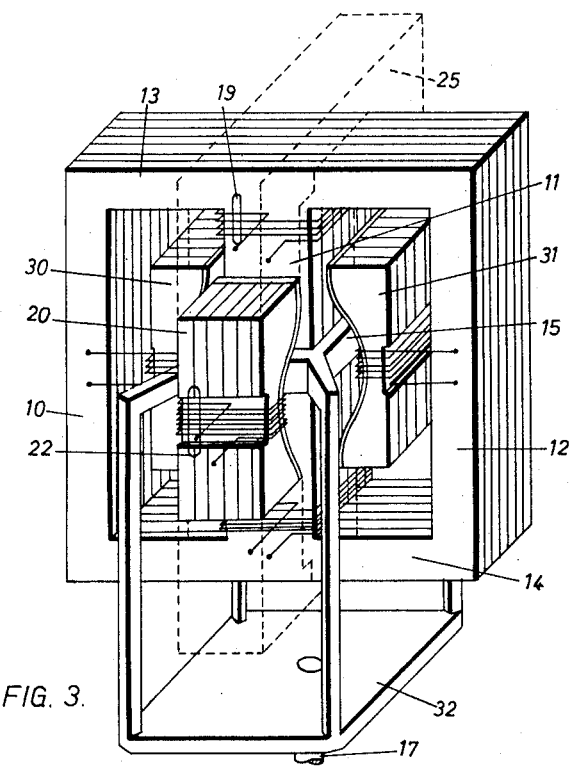

The invention will be better understood from the following description of three embodiments taken in conjunction with the accompanying drawings comprising FIGS. 1 to 8. In the drawings, FIGS. 1 and 2 show different embodiments of a 4-pole machine, FIG. 3 shows an 8-pole machine.

Figures 4, 5:
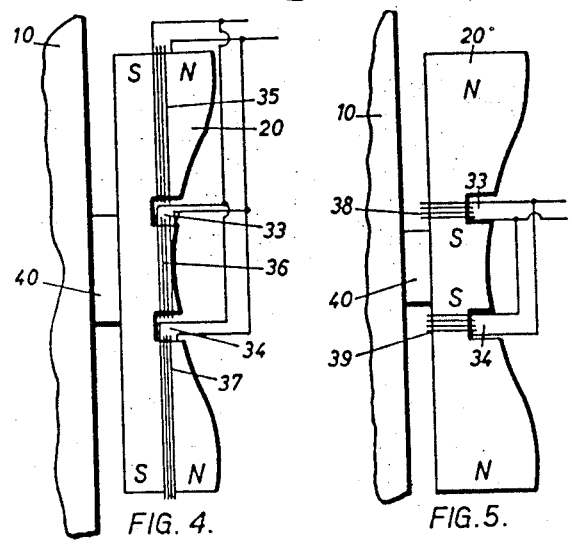
Figure 8:
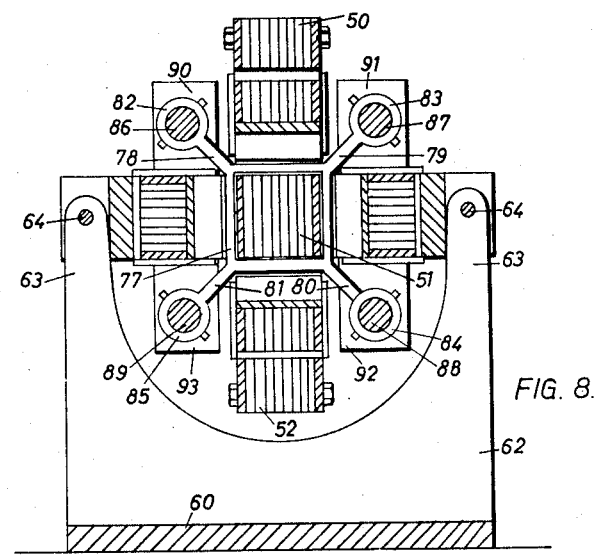
Figure 6:
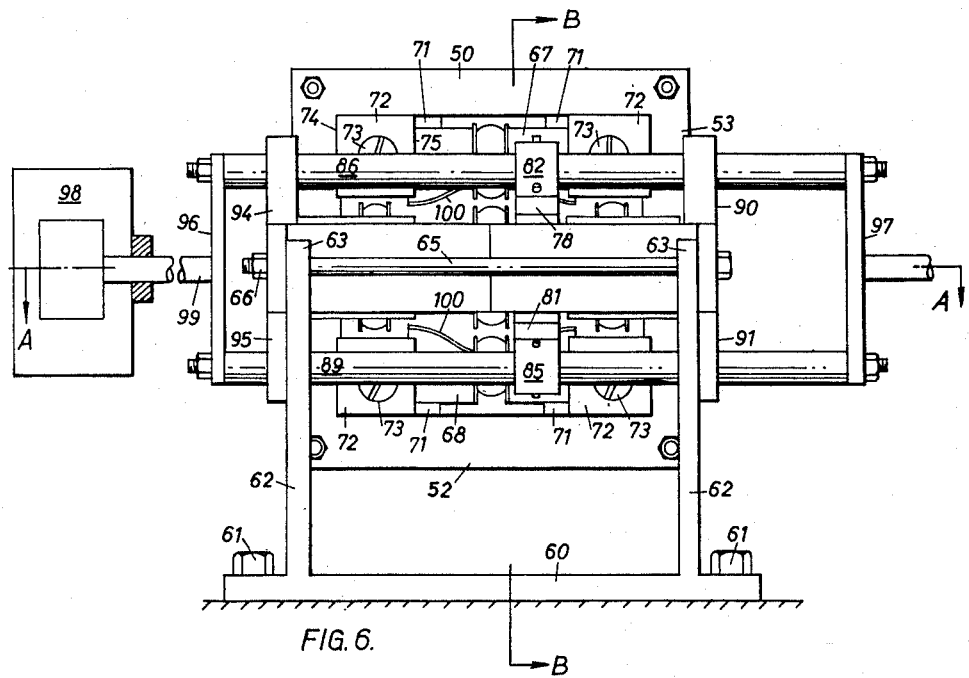
Figure 7:
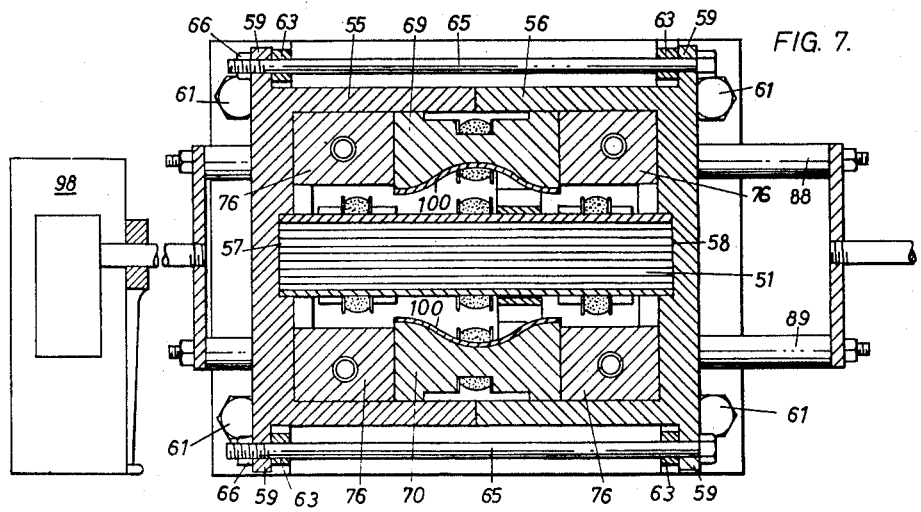

FIGS. 4 and 5 show alternative arrangements for use in constructing a 6-pole machine, and FIGS. 6 to 8 show respectively side elevation, plan view and cross-section of a practical form of the machine.

Referring first to FIG. 1, the main magnetic structure consists of three parallel limbs 10, 11, 12 joined at the ends by the limbs 13 and 14, the structure being built up from iron laminations. The coil of electrically conducting material, which consists of a ring 15 of copper, embraces the centre limb 11 and is connected by the U-shaped member 16 to a shaft 17. If the machine is to be used as a generator, the shaft 17 will be given a reciprocatory movement under the control of a prime mover indicated diagrammatically at 18. On the other hand if the machine is to be used as a motor, the shaft 17 will be connected directly to the moving part of the load which is indicated by the reference 18.

The central limb 11 of the magnetic structure carries two coils 19 from which the A.C. output of the machine is derived in the case where the machine acts as a generator. If the machine is to act as a motor, alternating current is applied to the coils 19.

A constant field is generated by two similar D.C. pole members 20 and 21 on each of which is centrally positioned an energising coil 22, 23 respectively, both coils being energised by direct current. The pole members 20, 21 may be suitably mounted on the inner faces of the outer limbs 10, 12 of the magnetic structure by means (not shown) such as, for instance, a block or blocks of non-magnetic material. As indicated in FIG. 1, when a direct current source is connected to the windings 22 and 23 opposite poles are generated at the two ends of each pole member to give the linear equivalent of a 4-pole rotating machine. If the machine is acting as a generator, the two coils 19 will be connected to the machine output and the copper ring is reciprocated along the central limb 11 by a prime mover. As the ring passes through the steady magnetic field, an alternating current will flow round the ring which acts as the primary of a transformer having the coils 19 as the secondary. It will be appreciated that since the magnetic structure is symmetrical, the alternating flux causing the transformer action will pass through the central limb 11 and the outer limbs 10 and 12 while the steady flux due to the steady magnetic field passes through only the middle portion of the central limb. In order to obtain a sinusoidal output at the terminals of the coils 19, the faces of the pole members opposite to the centre limb 11 are given the shape shown in the drawing. It will be understood that during one complete oscillation of the copper ring 15, the E.M.F. induced in it changes sign four times, twice because the D.C. flux changes sign and twice because the direction of movement is reversed. Hence an alternating voltage having a frequency of 50 c./s. is generated from a mechanical oscillation having a frequency of 25 c./s. Armature reaction is minimised by providing the pole faces of the pole members 20, 21 with slabs of conducting material, 24.

Alternatively, if the machine is to be used as a motor, the coils 19 will be connected to an alternating current source and accordingly an alternating magnetic flux will pass along the central limb 11 and the two outer limbs 10 and 12. In addition steady magnetic flux due to the D.C. energised coils 22 and 23 is also present in the central limb 11. The two magnetic fluxes in the central limb interact and a mechanical force is exerted on the copper ring 15 such that the ring oscillates on the central limb 11. Reversing the explanation of the generator action, if the frequency of the A.C. source is 50 c./s., the frequency of oscillation of the ring will be 25 c./s.

Armature reaction may be further minimised by using the arrangement shown in FIG. 2 where the pole members 20 and 21 are positioned perpendicular to the plane of the laminations of the main magnetic structure. The pole members 20 and 21 are secured relative to the main magnetic structure by means of blocks of non-magnetic material 25, 26 shown in dotted lines in FIG. 2 and fixed to the top and bottom limbs 13 and 14 of the main magnetic structure. The magnetomotive force set up in the pole members 20 and 21 by the direct current in the coils 22 and 23 drives the magnetic flux into the face of the laminations of the centre limb 11. Any leakage reactance or armature reaction flux now has to cross the laminations of the main structure in a direction perpendicular to their plane and assists in the suppression of these effects. It will be appreciated that with the construction shown in FIG. 2, it is not convenient to link the copper ring 15 with the shaft 17 by means of a U-shaped member such as shown in FIG. 1 and the frame 27 shown in FIG. 2 enables the connection between the ring 15 and shaft 17 to be taken from the sides of the ring which extend within the main magnetic structure, the frame 27 being connected to such sides of the ring by spindles such as 28. Other means of effecting the connection are also possible.

A further embodiment of the invention, giving an 8-pole machine, is shown in FIG. 3 and this consists of a combination of the embodiments shown in FIGS. 1 and 2 in that four D.C. pole members 20, 21, 30, 31 are employed, one opposite to each face of the centre limb 11 so enabling a maximum use to be made of the material of the magnetic structure. Again the connection between the ring 15 and shaft 17 will be different from that shown in FIGS. 1 and 2 and the frame 32 which is secured to the four corners of the ring 15 is a possible solution.

It will be understood that the invention is not limited in its application to machines having 4, 8, 12, 16 and so on poles but is also applicable to machines having 6, 10, 14 and so on poles. In the former application the net return flux due to the D.C. windings is zero and hence the pole members 20, 21, 30, 31 are magnetically independent of the main magnetic structure. In the latter application, the net return flux is not zero and a return path has to be provided for the return flux through the main magnetic structure. Thus, in constructing a 6-pole machine, each of the pole members 20 and 21 would be provided with a pair of slots 33 and 34 as shown in FIGS. 4 and 5 in which the energising coils are wound. In the case of FIG. 4, three coils 35, 36 and 37 are employed while in the construction shown in FIG. 5 two coils 38 and 39 only are necessary. The coils are so connected to the D.C. source that the pole sequence over the effective face of the pole member is the same in the two cases and is, for instance N above the upper slot, S between the slots N and below the lower slot. The pole member 20 will also be magnetically coupled to the limb 10 of the main magnetic structure by a block 40 of magnetic material which may be formed by a suitable shaping of the laminations forming the main magnetic structure.

It will be understood that a 6-pole machine will require the two pole members such as shown in FIG. 4 or 5 and that the remainder of the machine will be as shown in FIG. 1. For a 10-pole machine, each of the pole members 20 and 21 would be provided with four slots and either four or five coils would be provided according to whether the winding arrangement of FIG. 5 or FIG. 4 respectively is followed.

It will also be appreciated that while the pole members 20, 21 are shaped to provide a sinusoidal output, it is possible to obtain outputs having other wave shapes by differently shaping the pole members.

A practical form of the machine according to the invention is shown in FIGS. 6, 7 and 8 in which FIG. 6 is a side elevation of the machine, FIG. 7 is a part-sectional plan view in the direction AA of FIG. 6 and FIG. 8 is a part-sectional cross-section in the direction BB of FIG. 6. Referring to these drawings, the magnetic structure has the same shape as that shown in FIGS. 1, 2 and 3 and is built up from iron laminations, the structure being mounted in the vertical plane. The references 50, 51, 52, 53 and 54 indicate parts of the magnetic members having the references 10, 11, 12, 13 and 14 in FIG. 1. The magnetic member is held by a clamping frame consisting of two similar portions 55 and 56 of non-magnetic material, the plane of the clamping frame being perpendicular to the plane of the magnetic member. Each portion of the clamping frame has a cut-out 57, 58 in one of the inner edges to accommodate the arms 53, 54 of the magnetic member, and in addition, is provided with drilled lugs 59. The mounting frame 60 for the machine is bolted to the floor by bolts 61 and the end portions 62 of the mounting frame are provided at each side with support members 63 having holes 64 drilled through their upper ends. The clamping frame 55, 56 is secured to the mounting frame by clamping rods 65 which pass through the holes in the lugs 59 and in the support members 63 and the two portions of the clamping frame are drawn together by tightening the nuts 66 on the threaded end portions of the clamping rods.

The embodiment shown in FIGS. 6, 7 and 8 is similar to that shown in FIG. 3 in that four pole members 67, 68, 69 and 70 are provided. The pole members are formed of laminated sheet iron and two of them 67 and 68 are located so that their laminations are parallel to the laminations of the main magnetic structure whereas the remaining two 69 and 70 are located with their laminations perpendicular to those of the main magnetic structure. The pole members 67 and 68 are spaced away from the limbs 50 and 52 of the magnetic structure by non-magnetic spacing blocks 71 while they are each located longitudinally by means of two pairs of clamping blocks, one, 72, of each pair only being visible in FIG. 6. Tapped holes are provided in the clamping blocks and as each pair is drawn together by the screws 73, the flanged edges 74, 75 of the blocks engage with the inner edge of a limb e.g. the limb 54, of the magnetic structure and one edge of a pole member e.g. pole member 67, thereby effecting longitudinal location of the pole members. The pole members 69 and 70 are also located longitudinally by means of pairs of clamping blocks of which the lower ones 76 only are seen in FIG. 7. The clamping blocks in this case act on the clamping frame 55, 56 and the pole members.

The copper ring 77 which slides over the main limb 51 of the magnetic structure has four arms 78, 79, 80 and 81 formed integrally with it, the arms terminating in collars 82, 83, 84 and 85 adapted to be secured to four circular spindles 86, 87, 88 and 89. Each spindle is mounted in two bearings secured to the clamping frame 55, 56, the bearings 90, 91, 92, 93 for one end of the spindles being shown in FIG. 8 while the bearings 94, 90 for spindle 86 and bearings 95, 93 for spindle 89 shown in FIG. 6. The spindles are finally secured to two plates 96, 97 and plate 96 is connected to the mechanism 98 by the operating rod 99, the mechanism 98 being shown diagrammatically only. If the machine is to be used as a generator, the mechanism 98 will consist of a prime mover and the operating rod will be connected directly to a moving part of the prime mover, for instance, to the piston of a petrol engine. If the machine is to be used as a motor, the mechanism 98 will comprise the load and the operating rod will be connected directly to the moving part of the load, for instance, the piston of a valve type compressor.

As described in connection with FIGS. 1 to 5, the pole faces of the pole members 67 to 70 are covered with a slab of conducting material 100 to minimise armature reaction.

In the embodiment shown in FIGS. 6, 7 and 8 where the magnetic structure is built up from similar stampings, the copper ring is made in flat form with the arms attached and is then shaped round the centre limb of the magnetic structure and the ends welded together or brazed. An alternative method of construction would be to prefabricate the copper ring in the shape shown in FIG. 8 and to build up the magnetic structure in a similar manner to that for transformer cores, that is by alternate T and U sections, the long limbs of the T sections forming the centre limb of the magnetic structure. The long limbs of the T sections are then threaded through the copper ring as the magnetic structure is built up.

It will, however, be understood that there are many ways of constructing a practical machine in accordance with the invention and the construction shown in FIGS. 6, 7 and 8 is given by way of example only.

I claim:

1. An electrical machine comprising a magnetic structure having a centre limb and two outer limbs all of which are joined at both ends, two fixed coils mounted on said centre limb and carrying alternating current, a third coil mounted on said centre limb intermediate said two fixed coils and capable of reciprocatory movement therebetween and multi-polar field structures located adjacent opposite faces of said centre limb and energised from a direct current source to generate a steady magnetic field having a plurality of poles in the direction of said centre limb, the steady magnetic field being traversed by said third coil during its reciprocatory movement.

2. An electrical machine comprising a magnetic structure having a centre limb and two outer limbs all of which are joined at both ends, two fixed coils mounted on said centre limb and connected to the output of the generator, a third coil mounted on said centre limb intermediate said two fixed coils, means for imparting reciprocatory movement to said third coil and multi-polar field structures located adjacent opposite faces of said centre limb and energised from a direct current source to generate a steady magnetic field having a plurality of poles in the direction of said centre limb, the steady magnetic field being traversed by said third coil during its reciprocatory movement, whereby there is generated in said fixed coils an alternating current whose frequency is a multiple of the frequency of the reciprocatory movement of said third coil.

3. An electrical machine comprising a magnetic structure having a centre limb and two outer limbs all of which are joined at both ends, two fixed coils mounted on said centre limb and connected to an alternating current source, a third coil mounted for reciprocation on said centre limb intermediate said two fixed coils and multipolar field structures located adjacent opposite faces of said centre limb and energised from a direct current source to generate a steady magnetic field having a plurality of poles in the direction of the centre limb whereby interaction between the steady magnetic field and the field generated by current flow in said fixed coils causes reciprocatory movement of said third coil on said centre limb, the frequency of said reciprocatory movement being a sub-multiple of the frequency of the alternating current source.

4. An electrical machine as claimed in claim 1, wherein two multi-polar field structures are located adjacent a pair of opposite faces of said centre limb.

5. An electrical machine as claimed in claim 1, wherein two multi-polar field structures are located against each pair of opposite faces of said centre limb.

6. An electrical machine as claimed in claim 1, wherein each multi-polar field structure is provided with a single coil mounted tranversely of and equidistant from the ends of the structure to form a two-pole structure.

7. An electrical machine as claimed in claim 1, wherein each multi-polar field structure is provided with two coils mounted coaxially in spaced apart relation and transversely of the ends of the structure to form a three-pole structure.

8. An electrical machine as claimed in claim 1, wherein each multi-polar field structure is provided with three coils parallelly mounted longitudinally of the ends of the structure to form a three-pole structure.

9. An electrical machine as claimed in claim 1, wherein the face of each multi-polar field structure opposite to the centre limb is shaped in order to control the waveform of the alternating current generated or the character of the mechanical movement imparted to the third coil.

References Cited in the file of this patent

UNITED STATES PATENTS

| 2,859,391 | Ericson | Nov. 4, 1958 |
| 2,920,308 | Williams | Jan. 5, 1960 |